United States Patent [19]

Gabriel

[11] Patent Number: 4,865,372
[45] Date of Patent: Sep. 12, 1989

[54] SHOVEL-LIKE DIGGING, SCOOPING AND TRANSPORTING APPARATUS WITH BACK-STRAIN RELIEF FEATURES

[76] Inventor: Edwin Z. Gabriel, 91 Mt. Tabor Way, Ocean Grove, N.J. 07756

[21] Appl. No.: 211,063

[22] Filed: Jun. 20, 1988

Related U.S. Application Data

[63] Continuation of Ser. No. 11,933, Feb. 6, 1987, abandoned.

[51] Int. Cl.$^4$ ............................ A01B 1/04; E01H 5/02
[52] U.S. Cl. ...................................... 294/49; 294/54.5; 37/265; 37/130
[58] Field of Search ................... 37/265, 284, 285, 137, 37/130, 141 R, DIG. 12, 120, 121; 294/54.5, 55.5, 55, 57, 58, 59, 49

[56] References Cited

U.S. PATENT DOCUMENTS

| | | | |
|---|---|---|---|
| 316,181 | 4/1885 | Riethmayer | 37/284 |
| 827,542 | 7/1906 | Lawson | 37/265 X |
| 1,766,691 | 6/1930 | Rugg | 37/265 |
| 1,803,717 | 5/1931 | Lysne | 294/54.5 |
| 2,085,382 | 6/1937 | Nebor | 294/54.5 |
| 2,555,752 | 6/1951 | Merola | 294/54.5 X |
| 2,752,631 | 7/1956 | Wendt | 294/545 X |
| 2,846,785 | 8/1958 | Underwood | 294/54.5 X |
| 3,017,710 | 1/1962 | Carlson | 37/265 X |
| 3,024,547 | 3/1962 | Harrison | 294/59 X |
| 3,034,237 | 5/1962 | Wolfe et al. | 37/120 X |
| 3,063,174 | 11/1962 | Ludin | 294/55 X |
| 3,248,811 | 5/1966 | Pravednekow | 37/265 |
| 3,773,375 | 11/1973 | Nehls | 294/54.5 X |
| 3,923,331 | 12/1975 | Hollnagel | 37/265 |
| 4,316,627 | 2/1982 | Solypa | 294/55 X |

FOREIGN PATENT DOCUMENTS

| | | | |
|---|---|---|---|
| 71519 | 12/1942 | Czechoslovakia | 37/265 |
| 603538 | 4/1960 | Italy | 37/265 |
| 611369 | 10/1948 | United Kingdom | 294/49 |
| 695394 | 8/1953 | United Kingdom | 294/49 |

Primary Examiner—Clifford D. Crowder

[57] ABSTRACT

This is a compact shovel-like apparatus capable of performing many tasks, including digging, scooping up materials dug, and then enabling one to transport such materials to a chosen site, where the materials would be dumped without straining one's back. The apparatus consists of a removable handle, including bicycle-like handle bars, a round tubular member, and a shovel-head, capable of holding an ample quantity of materials. Runners are an integral part of the shovel-head's underneath to enable one to push the apparatus over suitable terrain, without lifting. For transportation over hard surfaces, like concrete sidewalks and streets, wheels are provided, as an option. In one embodiment the shovel-head is perforated to permit liquids to be discharged, while retaining nonliquid substances. This head's perforated surface may have a resilient plastic overlay to prevent liquids and powdery substances from passing through the holes. In another embodiment the tubular member's angle can be adjusted to suit the user for the particular gardening task to be performed, thus avoiding back strain. With the aid of the plastic overlay, the same basic shovel-head may be used for all of the embodiments. Also a technique is shown for quickly and effortlessly replacing just the toothed strip of the shovel-head. This apparatus being on wheels would enable some physically handicapped persons to do some gardening and similar tasks, including snow shoveling.

8 Claims, 17 Drawing Sheets

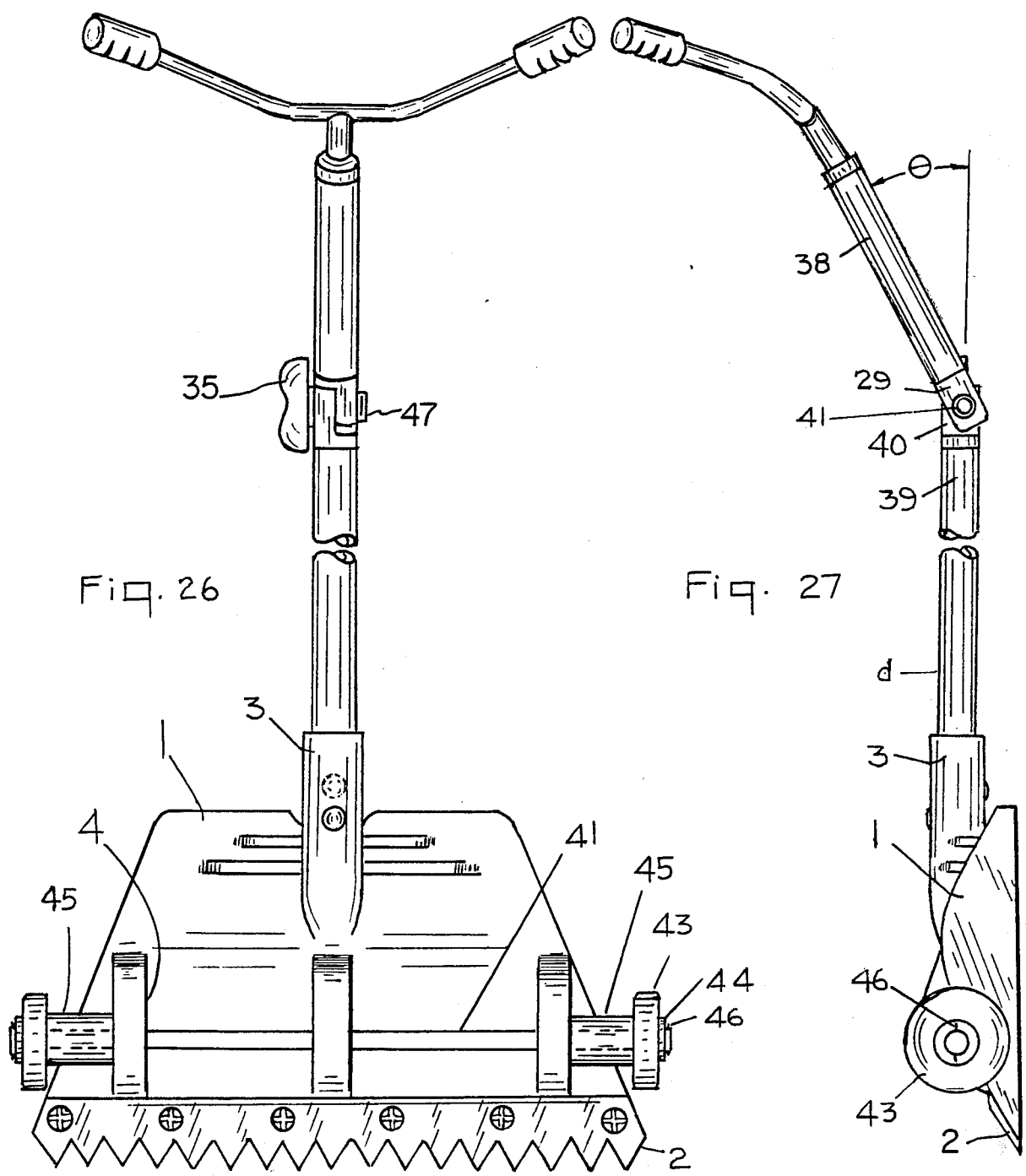

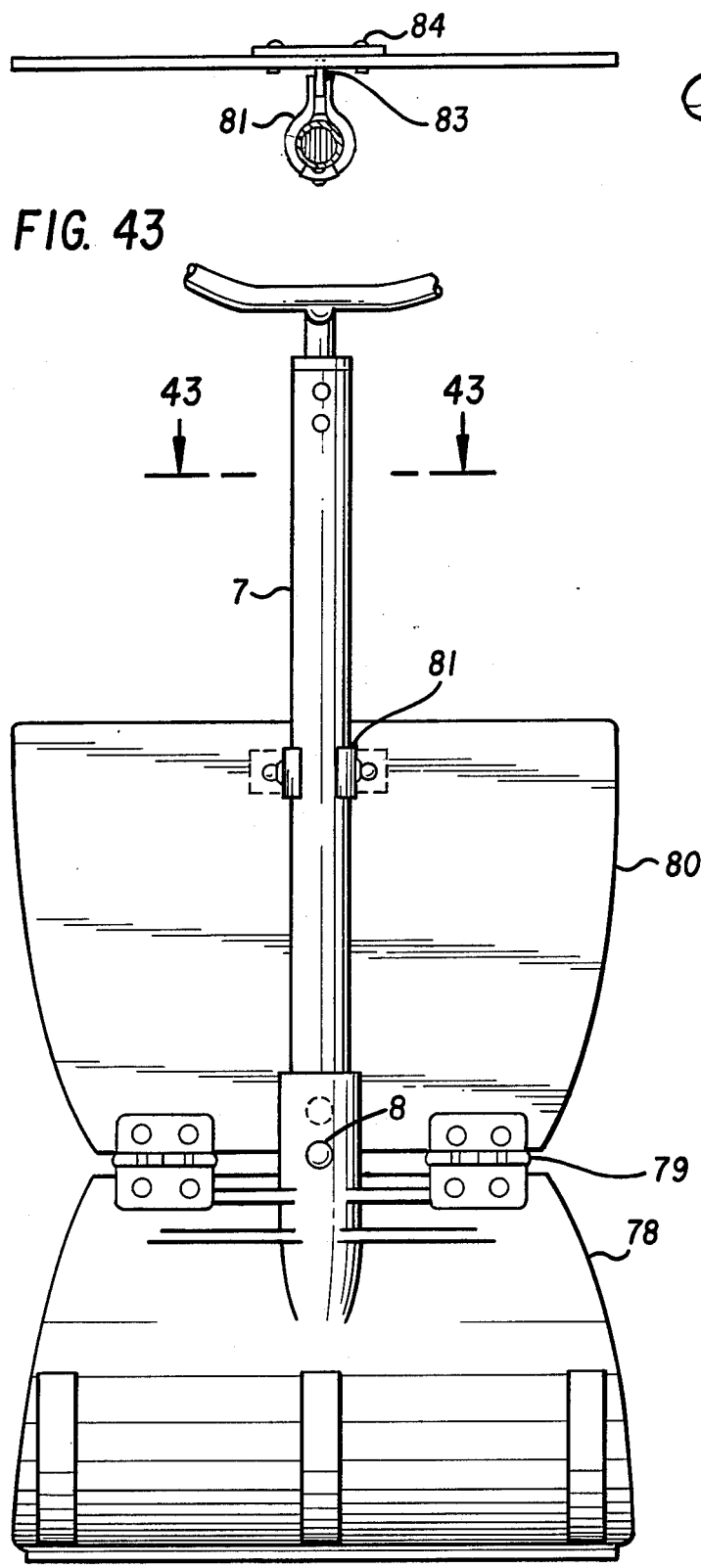
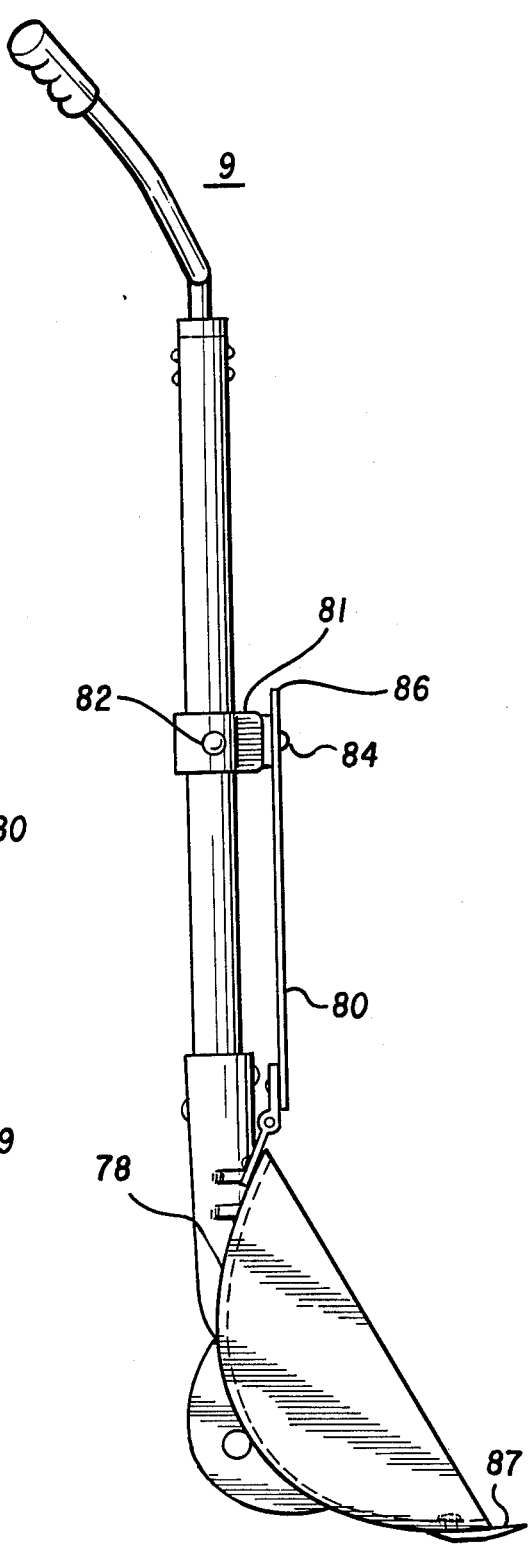
FIG. 43
FIG. 41
FIG. 42

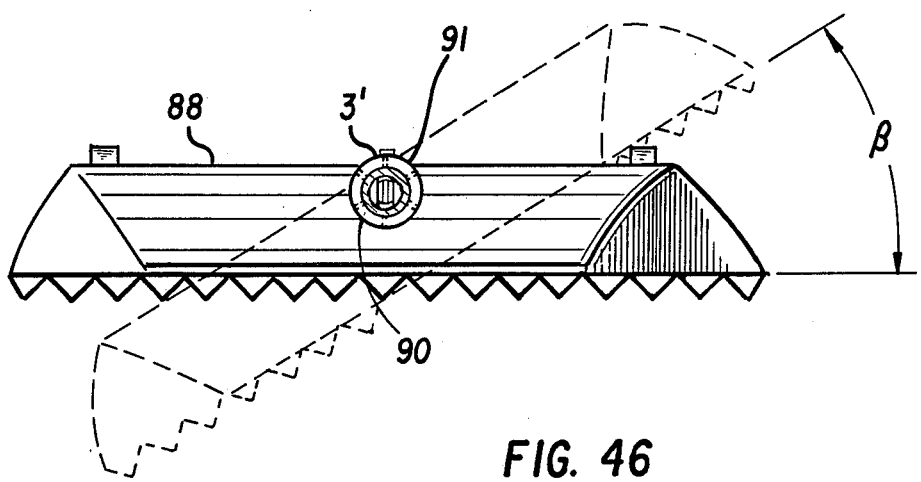
FIG. 46
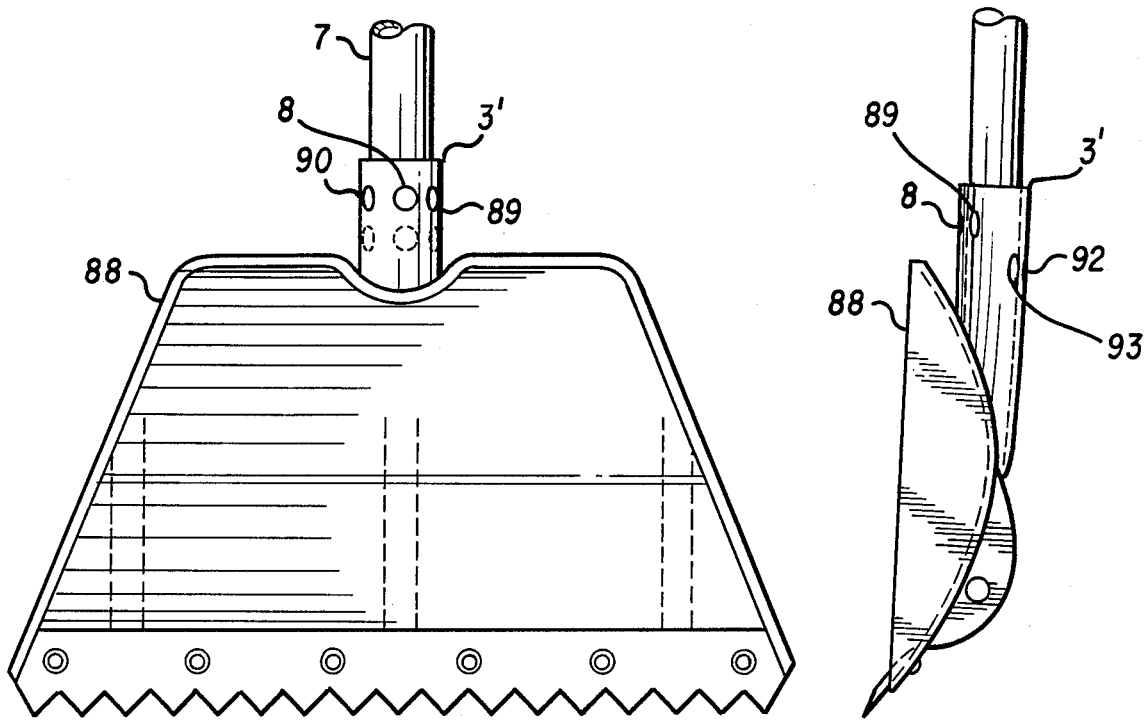
FIG. 44
FIG. 45

4,865,372

SHOVEL-LIKE DIGGING, SCOOPING AND TRANSPORTING APPARATUS WITH BACK-STRAIN RELIEF FEATURES

This is a continuation of application Ser. No. 011,933, filed 2/6/87, now abandoned.

BACKGROUND OF THE INVENTION

This apparatus being shovel-like would be compared with existing hand or manual-type shovels, being used to shovel coal, soil, snow, sand and gravel, and with water sprinkling cans and with seed distributors for vegetable gardening.

Presently, in order to move materials from one place to another one must dig into the material with the shovel's edge or with a fork, then physically lift up the shovel by hand, then throw the shovelful of material elsewhere, such as into a dump truck. This operation must be repeated until all of the materials are removed. This lifting and throwing of the material onto a waiting truck is hard and strenuous both on one's heart and on one's back. If a wheelbarrow is used to cart materials from one site to another, one must still use a shovel to fill the wheelbarrow. This apparatus can perform the combined tasks of a digging tool, a shovel and a wheelbarrow, without the strain on one's heart or on one's back. Though able to do the tasks of several gardening tools, it hardly heavier than a shovel, though one need never to lift it for most tasks. It has removable bicycle-type handle-bars and a replaceable mult-purpose shovel-head for replacement with other portions able to perform other functions. Replacing a shovel-head is a snap operation. The apparatus includes a combination of runners and wheels for transportation of the shoveled materials.

SUMMARY OF THE INVENTION

This is a multi-purpose, material-handling apparatus, capable of doing what many other existing garden tools together can do, performing the tasks with less effort.

The shovel-like apparatus' toothed edge can rake soil and leaves its concave, bowl-shaped shovel-head can hold materials like a small bucket; its wheels enable one to cart the materials elsewhere; its perforated shovel-head enables the user to fertilize and seed prepared soil for planting; its toothed front edge also enables one to dig into the ground, or into other soft materials, for construction of small dwellings and for storage enclosures. By using the proper technique, fish may be caught from streams and small lakes, using the perforated shovel-head. Also contaminated and hazardous wastes may be dup up and moved to another site. The three axle supports or runners underneath the shovel-head may be used for transportation of materials over soft ground. Wheels would be required when transporting materials over concrete or other hard surfaces. The wheels are easily installed and removed when not required.

The apparatus is comprised of a shovel-head, a removable tubular rod, which may be bent, attached to its lower portion and removable handle bars with grips, removably attached to the rod's top end. The lower shovel-head may be perforated to allow liquids to flow through. If perforated, a properly-shaped plastic sheet may be placed over its top surface. With press on adhesive along its borders, the sheet can adhere to the surface. This sheet, too, may be perforated with smaller holes, so positioned as to be in alignment with the existing larger holes of the shovel-head. When holes are not needed to allow liquids to flow through, the sheet would have no perforations, except for the six holes for the screws.

In regard to the tubular rod, a bent rod could be less strenuous on one's back, when using the apparatus for digging and shoveling. It is suggested as an alternative to the straight one. In addition, the tubular rod may be provided with adjustable bending capability to enable the user to bend the rod to suit his convenience. Such a design has been provided herewith.

BRIEF DESCRIPTION OF THE DRAWINGS

For the purpose of illustrating the invention, there are shown in the drawings forms thereof which are presently preferred. It is understood, however, that this invention is not necessarily limited to the precise arrangement, instrumentalities and field of utility as therein demonstrated.

FIG. 26 is a rear view assembly of the shovel-like apparatus, showing the axle and two wheels in place, and a technique for adjusting the angle of bending of the vertical tubular rod, shown in FIG. 1.

FIG. 27 is a side view thereof.

FIG. 31A is a plan view of another resilient plastic sheet without perforations, but with a tongue protruding near each of its four corners.

FIG. 41 is a rear view of the shovel-like apparatus' elevation, showing a bowl-shaped lower portion with a hinged cover.

FIG. 42 is a side view thereof with the cover lifted to a vertical position and latched.

FIG. 43 is a sectional view along line 43—43 of FIG. 41 with its bowl-like lower portion omitted.

FIG. 44 is a partial front elevation of the apparatus showing its lower portion only to illustrate its capability of being placed at an angle with respect to the supporting vertical tubular rod.

FIG. 45 is a side view thereof.

FIG. 46 is a top view thereof, showing in dashed lines the apparatus' lower portion rotated at an arbitrary angle to its normal full face normal position.

The drawings are not drawn to any scale.

DESCRIPTION OF THE PREFERRED EMBODIMENTS

These embodiments represent simple techniques for digging, plowing, scooping up and transporting the scooped up materials to a desired destination by means of a shovel-like apparatus. Options provided for the apparatus enable it to perform other tasks such as spreading seed on prepared ground, catching fish or plowing snow.

Figure 1:
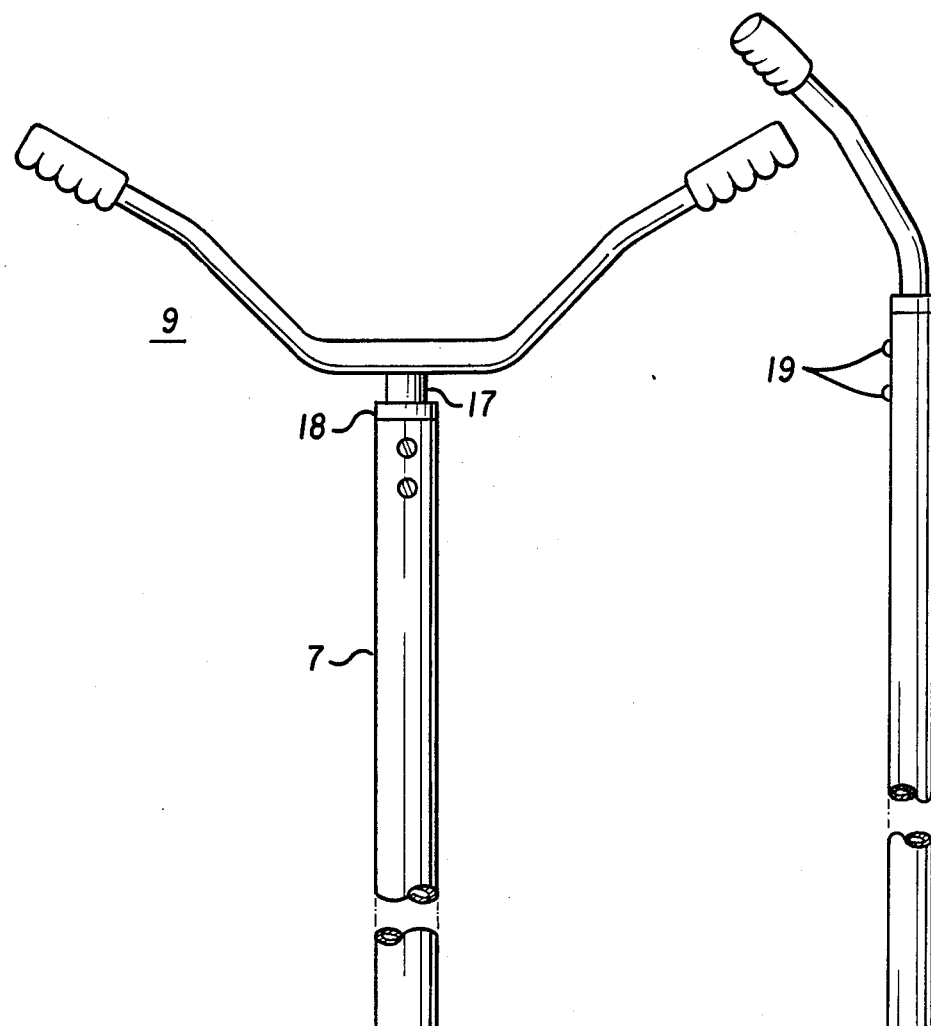
FIG. 1 is a rear view of a shovel-like apparatus with a lower combination shovel and digging portion, a vertical tubular member and handlebars with grips attached thereto.

FIG. 1 shows the back or rear side of the apparatus' assembly, which comprises the shovel-head 1, a vertical round tubular member 7 and bicycle-like handle bars 9. Elliptically-shaped runners 4 enable the shovel-head 1 to be pushed along the ground by handle bars 9. Head 1 has holes 6, located horizontally along its front edge for installation of either a sharp-edged toothed strip 2, FIG. 1, or a straight sharp-edge strip 24, FIG. 13, by either rivets or machine screws 6'. Strip 2's front edge teeth need not be pointed as in FIG. 9, but dulled, as in strip 61, FIG. 35, to avoid causing accidental personal injury.

Runners 4 have holes 5 for installation of an axle with wheels mounted at its outer extremities, not shown in this view, FIG. 1, but shown in FIG. 26, for pushing and maneuvering the apparatus more easily, particularly on hard abrasive surfaces. There are other advantages for wheels over runners. Numeral 12 points to rib on shovel-head 1. Numeral 16 points to its sides, FIG. 2.

Figure 2:
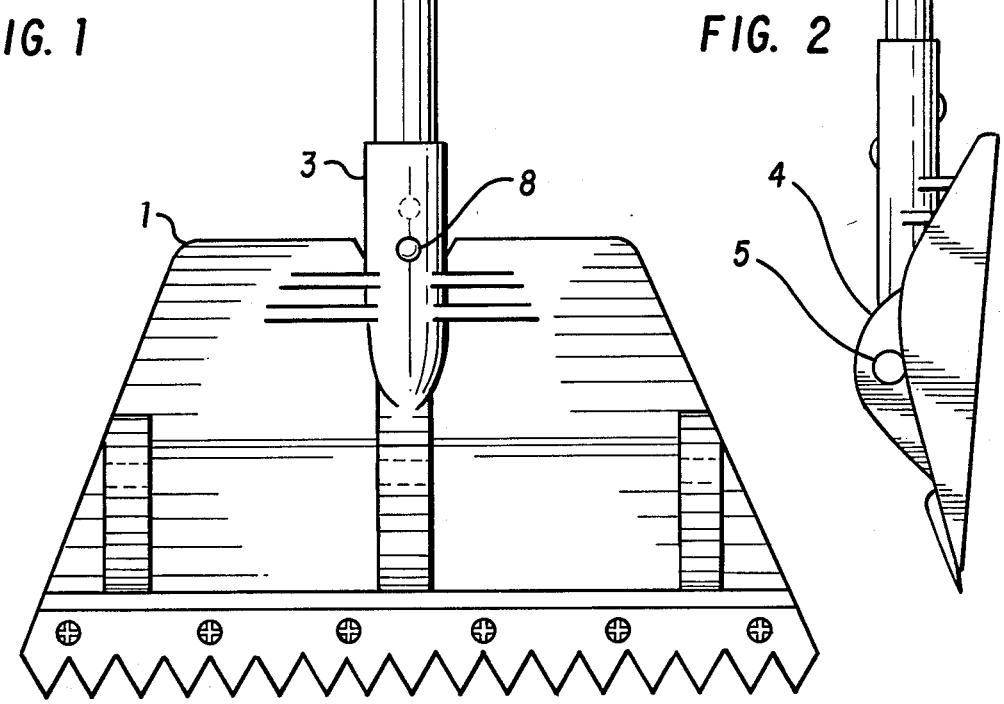
FIG. 2 is a side view thereof.
Figure 4:
FIG. 4 is a top view thereof.
Figure 3:
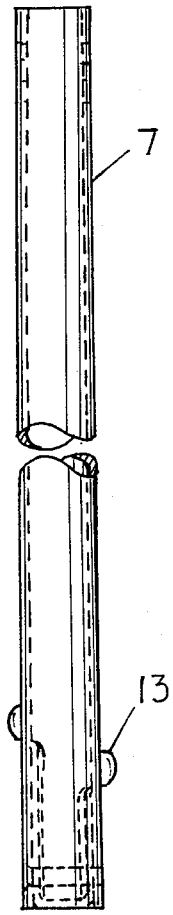
FIG. 3 is a detailed elevational view of the vertical tubular rod.
Figure 5:
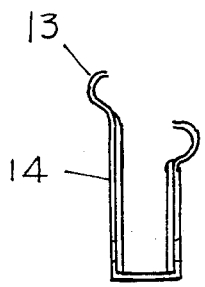
FIG. 5 is a front enlarged elevational view of the springy retainer strips for retaining the lower shovel-head in place. It includes a spherical button on top, which protrudes through a hole.
Figure 6:
FIG. 6 is a side view thereof.

Shovel-head 1 has a tubular upper part 3 for insertion of the bottom end of round tubing or rod-like member 7 shown in elevational view FIG. 3. Tubing 7 includes two semi-spherical projections 13, protruding through two diagonally opposite holes near lower end of tubing 7. Spherical projections 13 are the upper portions of a spring steel stamping from a flat strip of the metal, 14, shown enlarged in FIGS. 5 and 6. In essence, these projections could be described as protruding buttons attached to leaf springs or integral parts thereof. As shown in FIG. 3, strips 14 are fastened near their ends to tubing 7, either by rivets or by a screw passed through washers 15. Normally, because of the spring steel metal, projections 13 protrude out through holes in tubing 7, as shown in FIG. 3 in order to lock end of tubing 7 inside of tubular part 3 with projection 13 protruding through hole 8, FIG. 1. When inserting lower end of tubing into tubular part 3, spring steel strips 14 allow projections 13 to recede inward, to enable tubing 7 to be pushed down into the cylindrical opening of tubular part 3, and to lock in place when projections 13 protrude through holes 8, diagonally opposite from each other, FIGS. 1 and 2. One simply rotates tubing 7 until projections 13 snap into holes 8.

Figure 7:
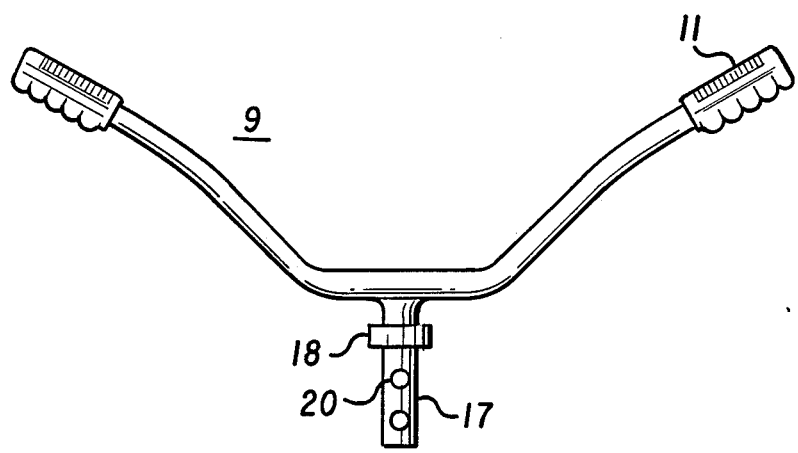
FIG. 7 is a front view of the handlebars, including grips and a vertical stem, which are off-the-shelf items.
Figure 8:
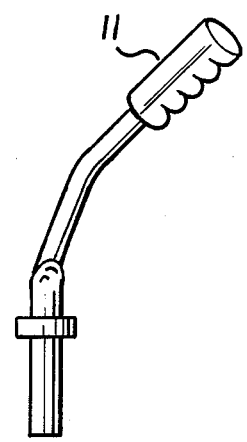
FIG. 8 is a side view thereof.

After tubing 7 has been inserted in shovel-head 1, FIG. 1, then tubular stem 17 of handle bars 9 is inserted into tubing 7's upper hollow end, until it sits on collar 18, rigidly fastened to stem 17. Handle bars 9 are held rigidly in place by machine screws 19 passed through holes 10 at one surface of tubing 7, passing through holes 20 of stem 17 and then screwed into the opposite sides thickness of tubing 7. Handle bars 9, FIG. 7, are fitted with rubbery grips 11, at each of the ends of bars 9. Bars of this type can be obtained off-the-shelf from a tricycle manufacturer. Then, round tubing 7, FIG. 3, can be obtained from the Aluminum Co. of America, Pittsburgh, Pa. Choice of several alloys, and outside and inside diameters may be specified. For very heavy work, an outside diameter of 1-inch and an inside diameter of ¾ inch are suggested for an aluminum alloy such as 2014-T6, a high strength alloy. For less strenuous work one could use the aluminum alloy 6061-T6.

To dig, one would hold handle bar grips 11 and push down on tubing 7 to cause teeth 21 to dig into semi-soft ground or other materials, such as sand, gravel, mortar, then one would push into the material to scoop up and obtain a shovelful. The softer the material, the more one could scoop up on the first try. Then one would tip handles 9 down sufficiently to enable the apparatus to ride on runners 4, FIG. 1, to transport the material to a desired nearby destination. One would turn the shovel over into a vertical position or entirely over to dump out the shovel's contents. If the dump site is ground or equivalent, then one could drop or knock the shovel end into the soil to aid in the removal of its contents. Finally, one could remove any remaining material from inside the shovel with a small plastic scoop. The effort to transport the shovel's contents by pushing it along the ground on runners 4 would be considerably less than having to carry the shovel and its contents to a destination, as sometimes is presently done. Teeth 21, FIG. 1, could be used also for preparing the ground for seeding by using it like a rake. By applying a silicone substance to the shovel-like head's top exterior surface, less tendency would exist for materials to adhere. Also this portion's plastic material itself could be impregnated with silicone.

Figures 13, 14:
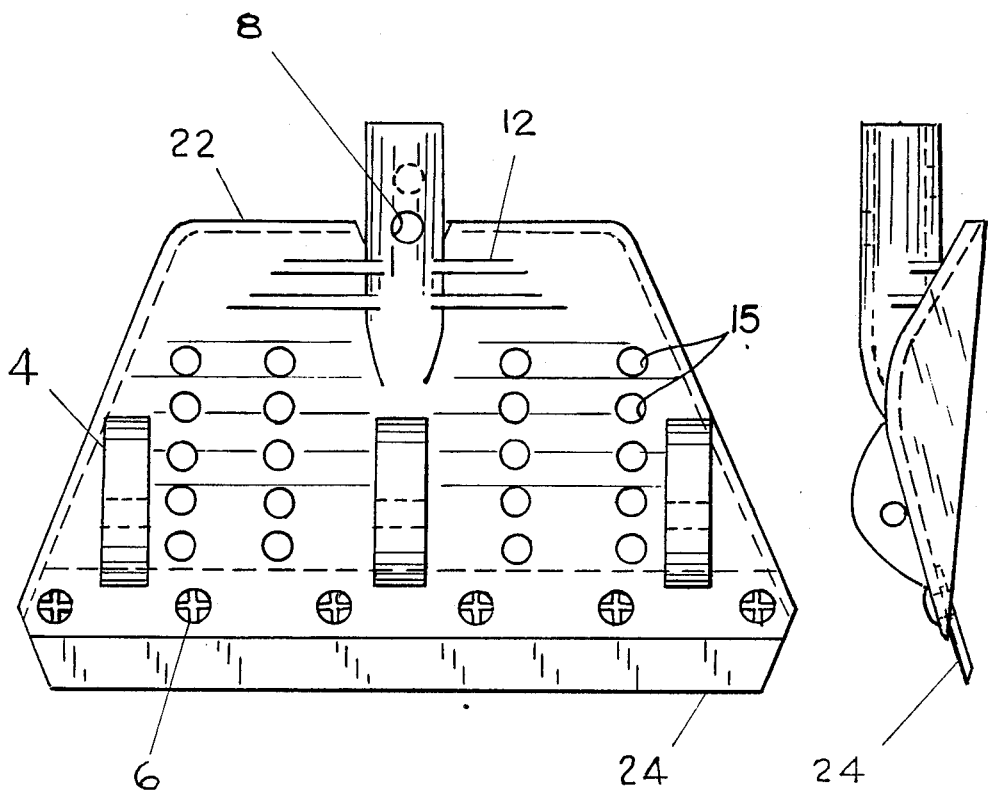
FIG. 13 is a detailed elevational rear view of the shovel-head alone, showing the perforations or holes.
FIG. 14 is a side view thereof.

For spreading fertilizer and seed, one could replace shovel-head 1, FIG. 1, with shovel portion 22 with perforations, or holes 23, FIG. 13. To accomplish the replacement, one would use one's fingers to depress projections 13, FIG. 3, into holes 8, FIG. 1, while simultaneously pulling up on tubing 7. Upon removing tubing 7 from shovel-head 1, one would replace it with the perforated shovel-head. Holes 23 in shovel portion 22, FIG. 13, would be the size appropriate for the fertilizer material to be spread over the prepared ground; the same would apply to the spreading of seed into the prepared soil.

An alternate design approach for a more versatile shovel-like apparatus is described below. In this more versatile embodiment, one could use the same apparatus both for spreading fertilizer, seed, dredging lakes and catching fish and for ploughing, digging, scooping up soil and other materials including wet materials, and transporting them to a desired destination.

Figures 47, 48:
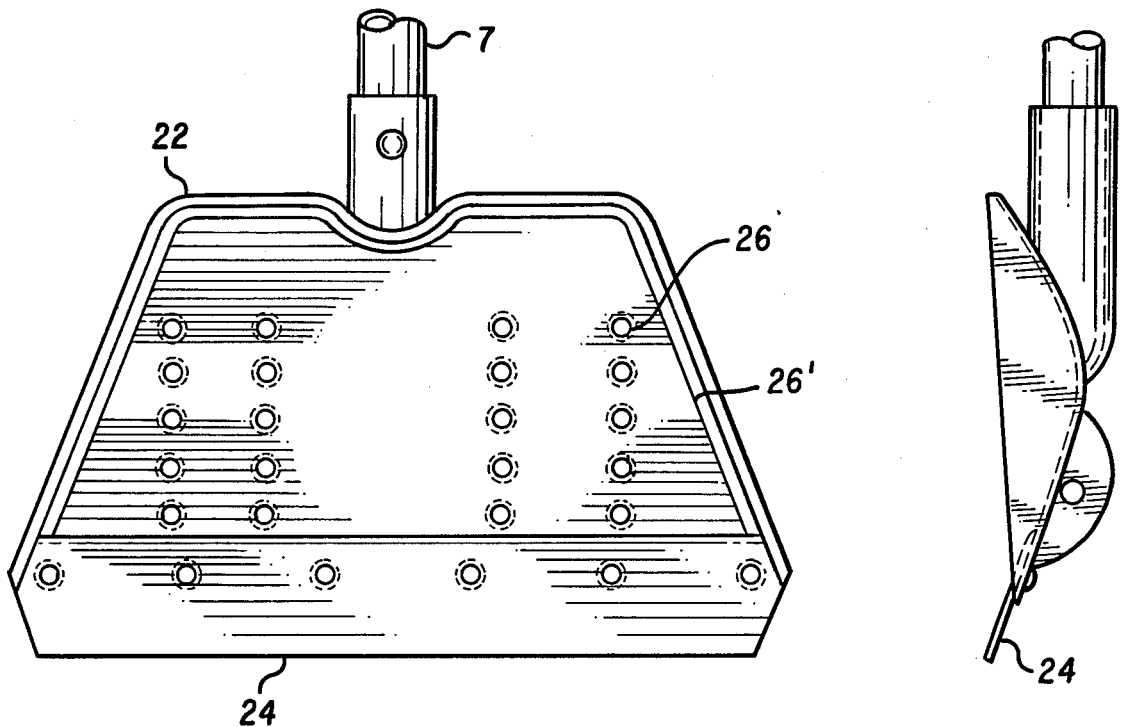
FIG. 47 shows a front view assembly of shovel-head in FIG. 13 with pliable sheet in FIG. 28 and with a portion of rod member.
FIG. 48 shows a side view thereof.

For perforated shovel-head 22, FIG. 13, one would use the largest holes anticipated to be needed for spreading fertilizer, insecticides and other materials. Then one would use an overlay sheet 26 with smaller size holes for other substances, including water, requiring smaller holes. The centers of the smaller holes would coincide with the centers of the larger holes, when superimposing this sheet over the top of shovel-like head's surface 22, FIG. 13. One way to place sheet 26' over the top surface of portion 22, is to remove bolts 26 along its front horizontal edge and place sheet 26', with its six (6) holes 27 coinciding with the identical shovel-like head's holes; the other holes on sheet 26' would also align with the shovel's holes. Sheet 26's borders, having "press-on" adhesive underneath, indicated by dashed lines, would stick to the shovellike portion's top surface, preventing the entry of any substances scooped up. Thus, in effect, shovel-like head's larger holes would now assume the size of holes of the overlay. To assure the passage of powdered or granulated fertilizer through the holes, it is advisable to shake the shovel-head sideways the needed number of times for the desired amount of flow through. FIG. 47 shows a partial front view assembly of the apparatus with overlay 26' containing smaller holes 26 in position on the support surface of head 22. FIG. 48 is a side view thereof.

Figure 30:
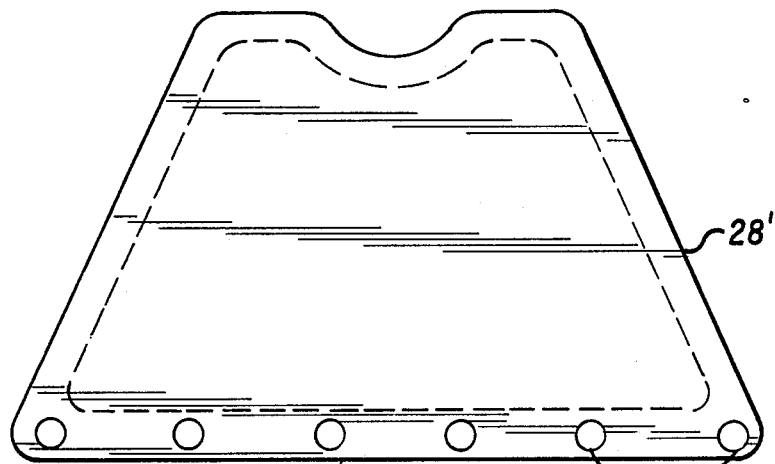
FIG. 30 is a plan view of the resilient plastic sheet without perforations for superimposing over the perforations of the shovel-head. Holes along its lower border are for fastening this sheet with screws to the holes along the front edge of the shovel-head.

In addition, sheet 26' could have no perforations, except for the six (6) horizontal holes along its front edge as shown in FIG. 30 and identified by numeral 27. Again one would remove the front six bolts or machine screws and replace sheet 26' with sheet 28, which also has "press-on" adhesive underneath its borders. After replacing 26' with 28, one would replace the six machine screws and lock washers along with either the stainless steel front strip 2, the triangular-toothed member, or strip 24, the straight-edged members, depending on the application. With sheet 28 in place, this apparatus would be capable of performing the tasks of the apparatus shown in FIG. 1. Thus, the apparatus with perforations in its shovel-like head would be a more versatile instrument and tool, without appreciable increased cost in its manufacture.

Figure 28:
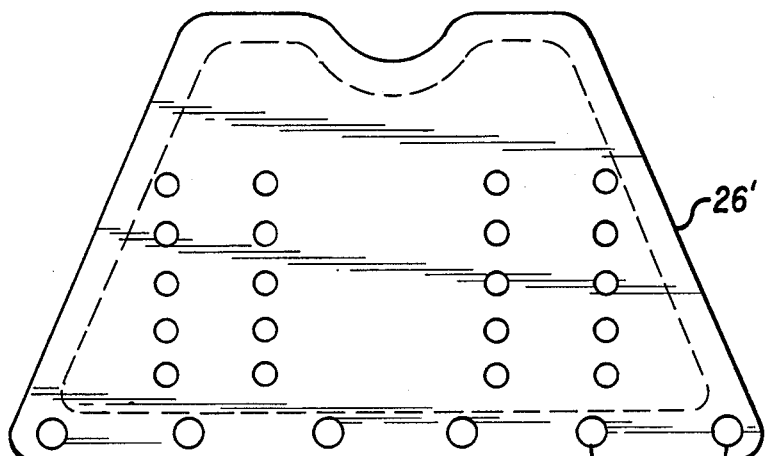
FIG. 28 is a plan view of the perforated resilient plastic membrane or sheet for superimposing over the perforated shovel-head. These perforations are smaller in size than those in the shovel-head. Holes along its lower edge are for fastening sheet to the lower horizontal line of holes of the shovel-head.
Figure 29:
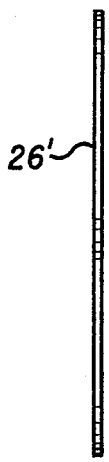
FIG. 29 is a side view thereof.

In addition, when worn, either sheet 28 or 26' could be easily replaced, while retaining the same shovel-like head 22, FIG. 13. Either sheet could be pryed up with a sharp-edged tool. Any residue remaining could be scraped off before replacing either sheet 28 or 26', FIG. 30 or FIG. 28. Holes 27 are omitted in FIG. 31A being a shorter overlay. Projections 100 enable sheet to be removed.

To further explain the versatility of the shovel-like head, in FIG. 13, stainless steel strip 24, without teeth, replaces toothed strip 21, when the task requires no teeth. Strip 24's six threaded holes coincide with portion 22's existing holes, FIG. 13. Machine screws would pass through holes from underneath of head 22 and screw into the threaded holes of strip 24, with either sheet 26 or 26' sandwiched in between strip 24 and portion 22.

Figures 15, 16:
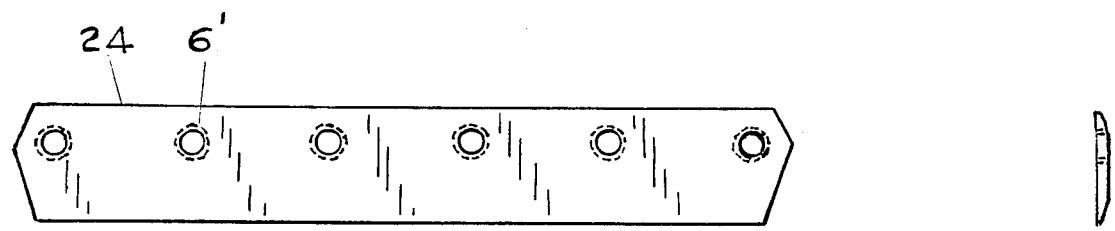
FIG. 15 is a front view of the plain steel strip attached to the front edge of the shovel-head of the apparatus for nondigging applications.
FIG. 16 is a side view thereof.

FIGS. 15 and 16 show the elevation and side views, respectively, of plain strip 24. Holes 25, FIG. 15, are threaded for screwing of round or flat-head screws, for fastening the parts together.

Figures 11, 12:
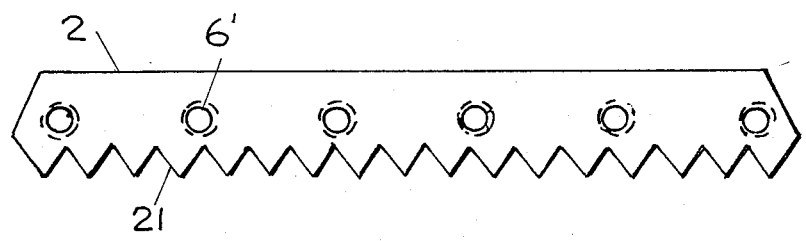
FIG. 11 is a front view of the steel toothed strip that is normally attached to the front edge of the shovel-head for digging.
FIG. 12 is a side view thereof.

FIGS. 11 and 12 show the elevation and side views respectively, of the steel strip 2 with teeth 21. Holes 6, FIG. 11, are threaded like holes 25 for screwing of round or flat-head screws. The screws would be inserted first into the six plain holes of head 1, FIG. 9, along its front edge; then through similarly placed holes in either sheet 28 or 26', if required, then screwed into threaded holes 6, FIG. 11. Strip 2 may be positioned either on the top surface, when either sheet 28 or 26' is not used. Lock washers may be used with the above screws, if required. Teeth 21 normally would be sharpened to enable it to dig more easily.

Figures 17, 18:
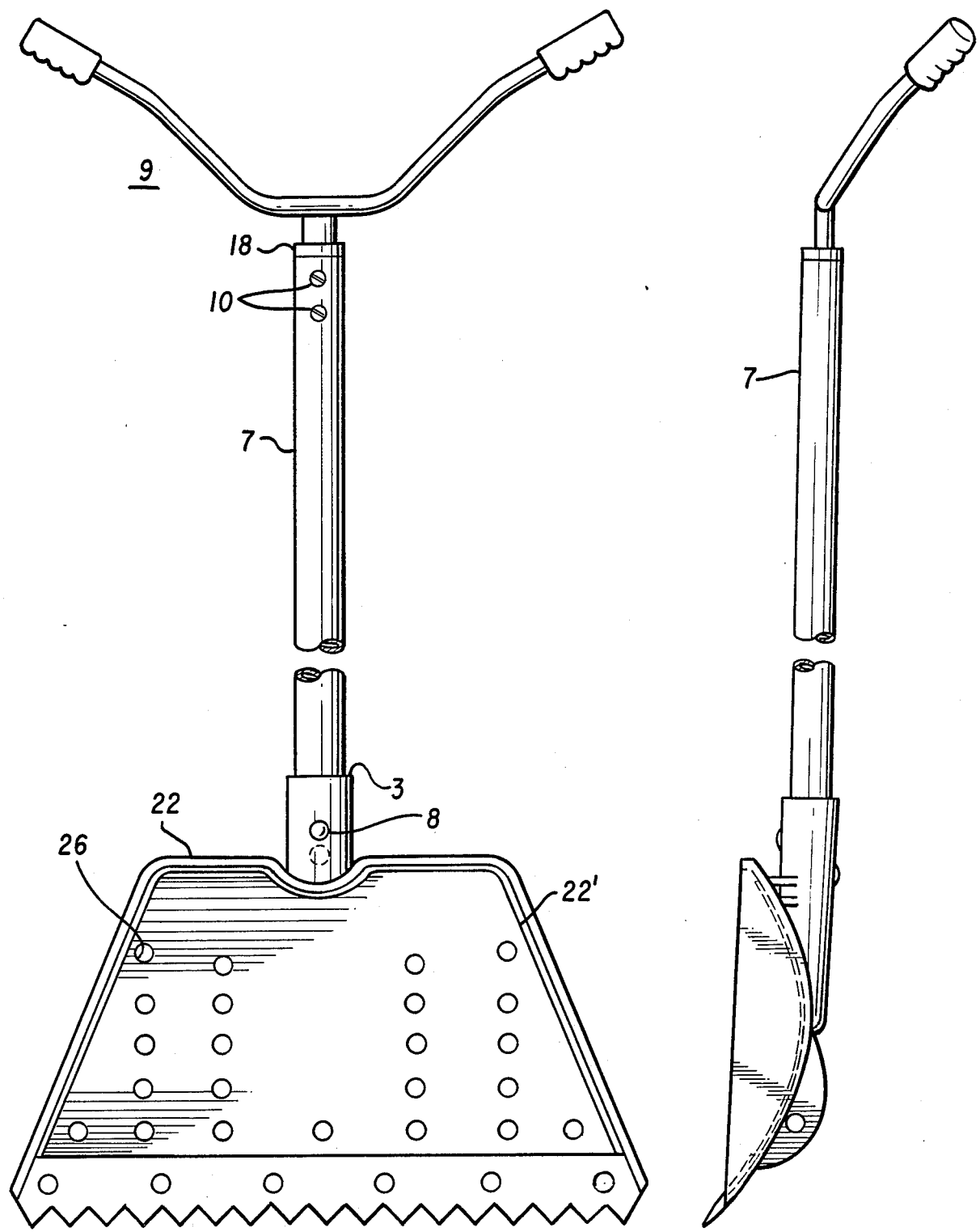
FIG. 17 is a front view of a shovel-like apparatus with a lower combination shovel and digging portion, vertical tubular rod and handlebars attached thereto, wherein the shovel-head is perforated.
FIG. 18 is a side view thereof.

FIGS. 17, front view, and 18, side view, show the complete assembly of the toothed shovel-like apparatus, wherein its shovel portion is perforated.

Figures 24, 25:
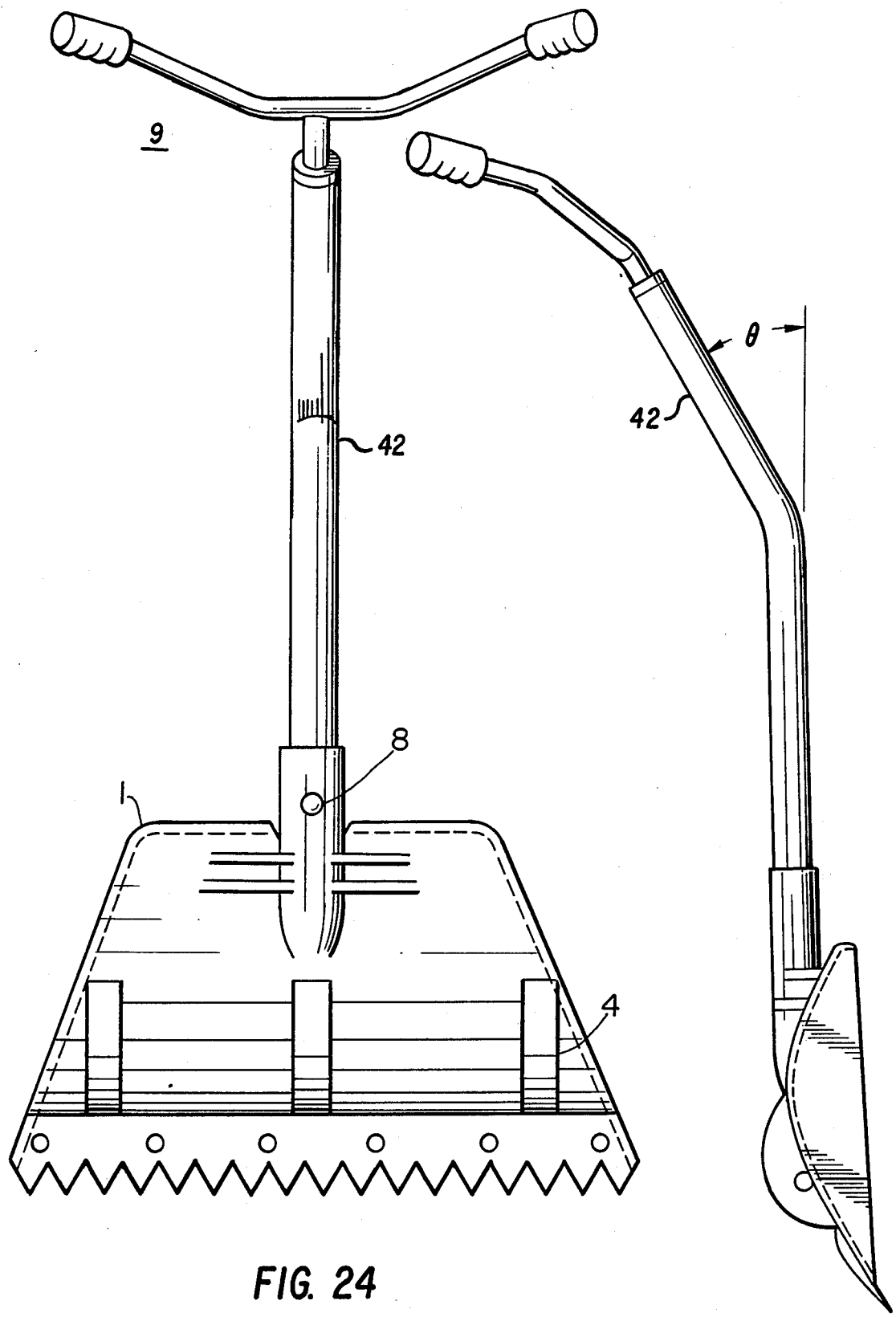
FIG. 24 is a rear view assembly of the shovel-like apparatus, showing a bent tubular rod and other slight differences from FIG. 1.
FIG. 25 is a side view thereof.

Another embodiment of the assembled shovel-like apparatus is shown in FIGS. 24 and 25. The only difference between this assembly and the one shown in FIG. 1 is its tubular rod 42. In this design, one could be in a more comfortable position to plow or dig into the earth, as the tubular rod is bent at an angle $\theta$ with the vertical or with the lower half of the rod. In FIG. 25, $\theta$ is 30°. However, the angle of bend may differ to suit the user's convenience. In this design, once set, the angle cannot be changed, unless another tubular rod with a different desired angle is used as a replacement. FIG. 24 shows its rear view, while FIG. 25 shows its side view. Another embodiment has been devised to provide the adjustability for this tubular rod's angle of bend, as shown in FIGS. 26 and 27.

Figure 32:
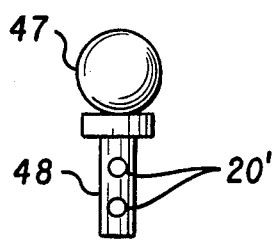
FIG. 32 is an elevational view of a spherical knob with a stem as a substitution for the bicycle-like handle-bars, for tasks not requiring handle-bars.

The bicycle-like handle-bars 9, FIG. 7, may be replaced by knob 47 with stem 48, FIG. 32 to enable one to use this apparatus as a shovel, such as lifting it to place or throw its contents into a dump truck, for example. Holes 20' are identical to holes 20 of handle-bars of FIG. 7.

ANOTHER PREFERRED EMBODIMENT OF THE SHOVEL-LIKE APPARATUS

Figure 21:
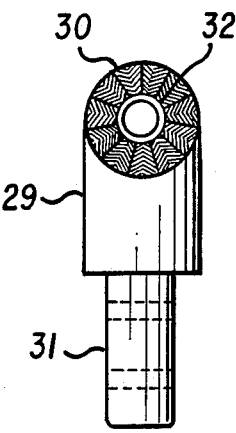
FIG. 21 is an elevational view of one-half of the adjustability portion showing teeth on a circular surface with a threaded central hole. This portion's round stem slides into the hole of the round tubing.
Figure 22:
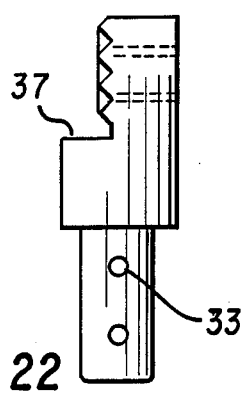
FIG. 22 is a side view thereof.

To provide for adjustability in the bend of tubular rod 7, FIG. 2, or of rod 42, FIG. 25, rod 7 is cut in two, midway, approximately. To each cut end a toothed surface 30, FIG. 21, having a cylindrical stem 31, is inserted into each hollow cut end, 38 and 39, FIG. 19, of the tubular rod, with the stem end 31 or 31', going into the tubular end, 38 or 39. Note that each piece 29 and 40 with teeth, is so inserted that its teeth 30 face each other, as in assembly drawing, FIG. 19. A thumb screw 35 passes through plain hole 34, FIG. 23. Upon tightening screw 35, teeth 30 and 30' of pieces 29 and 40 mesh to prevent tubular rods 38 and 39 from altering the angle between their centerlines 38' and 39'. Lock washer 36 assists in preventing screw 35 from loosening. Hole 32 is threaded.

Now to change the angle between centerlines 38' and 39', thumb screw 35 is loosened sufficiently to enable tubular rods 38 and 39 to be adjusted angularly, with respect to each other, the desired amount. Then thumb screw 35 is again tightened.

Figure 23:
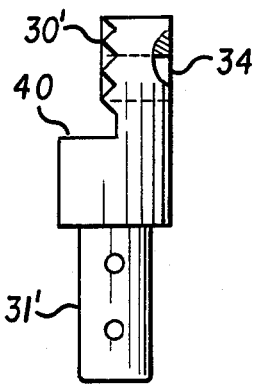
FIG. 23 shows the other half of the adjustability part. It also has a hole at the center of the toothed circular surface, but this hole is not threaded as in FIG. 22.
Figure 20:
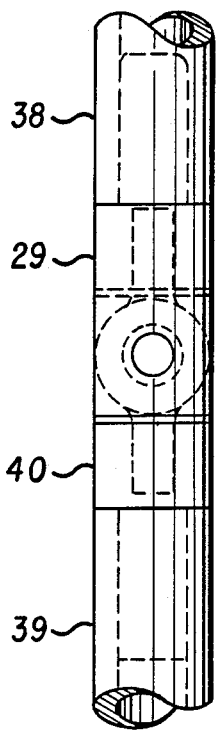
FIG. 20 is a side view thereof.
Figure 19:
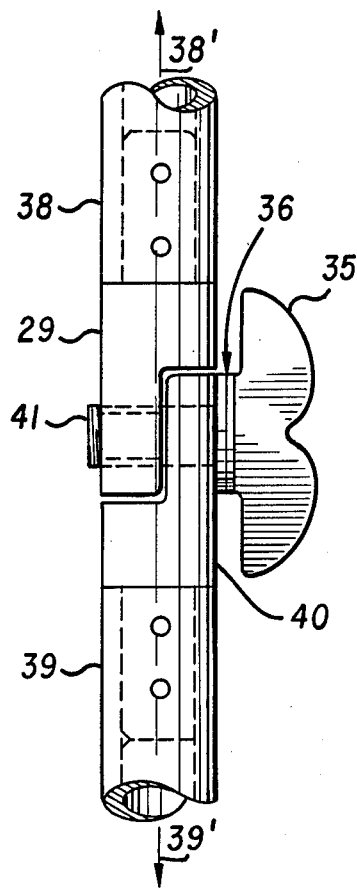
FIG. 19 is that portion of the vertical round tubing that can provide adjustment to its angle of bending, the tubing being the vertical member attached to the shovel portion. An elevational assembly view is shown.

FIG. 23 is a left side elevational view of the portion shown in FIG. 19, to show thicknesses of parts not shown in FIG. 19.

FIG. 26 shows the rear view assembly of the shovel-like apparatus with a tubular rod angularly adjustability feature, wherein angle θ may be adjusted to any desired angle to suit the user. Details of the technique are shown in FIGS. 19 to 23 and embodied in assembly drawing FIG. 26. In this assembly wheels 43 have been added to the shovel-head 1'. The wheels are mounted on axle 41, passing through holes 5 or runner 4, FIG. 26. Hollow portions 45 are identical spacers to enable wheels 43 to maintain their positions, clearing the exterior sides of the shovel-head 1'. Wheels 43 are also held in place by plain washers 44 and cotter pins 46. Wheels 43 rotate about ends of axle 41 with ease. The same shovel-head 1, FIG. 1, may be used in this embodiment, as well as the same bicycle-like handle bars 9. Simpler handle bars may be used than the off-the-shelf tricycle handle bars shown. The simpler version would comprise a straight horizontal tubular member welded at its center to a stem similar to stem 17, FIG. 7. Plastic grips 11 would be applied to the ends of this horizontal member. Then, for additional convenience, the horizontal tubular member could be slightly bent in, toward the direction of the user, as bars 9, FIG. 7. In FIG. 27, the location of adjustable bend need not be where shown. Pivot point 41 could be located at position "d" of rod 39, for less back strain when shoveling.

Figures 9, 10:
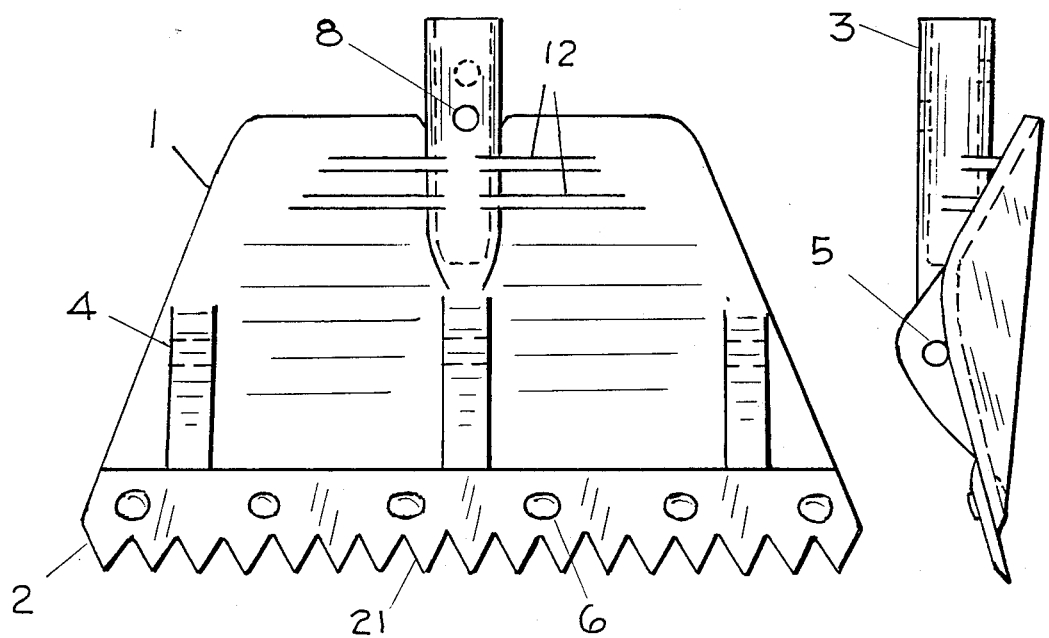
FIG. 9 is a detailed rear view of the shovel-head itself.
FIG. 10 is a side view thereof.
Figures 33, 34:
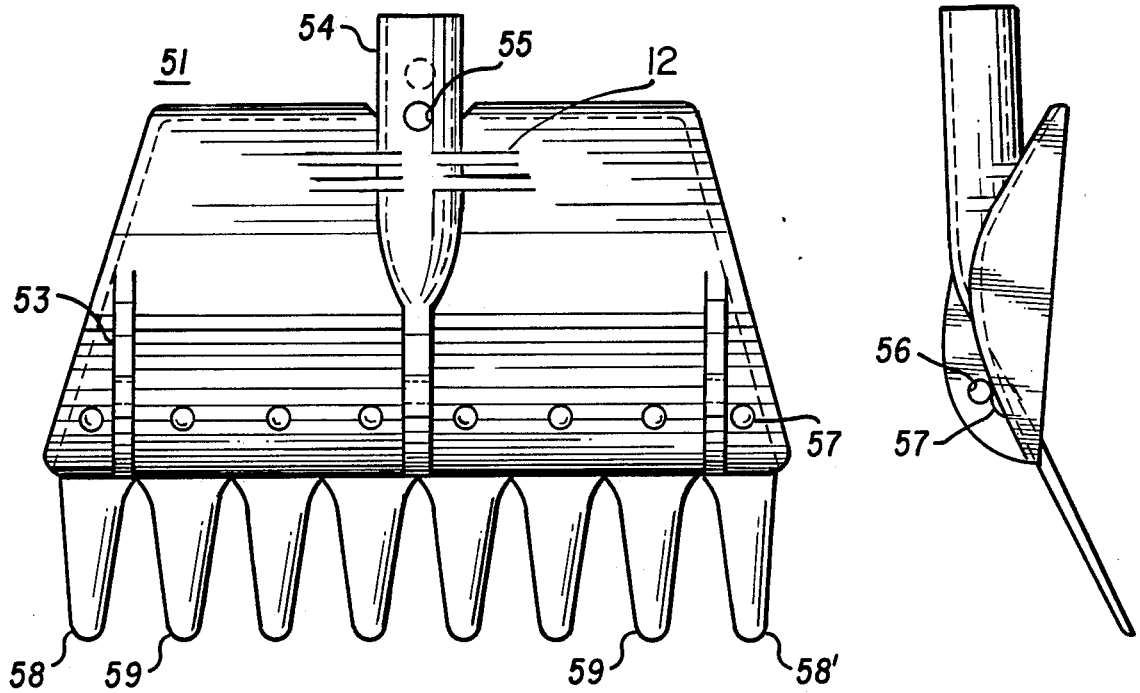
FIG. 33 is a rear view of a shovel-head with longer teeth.
FIG. 34 is a side view thereof.
Figures 49, 50:
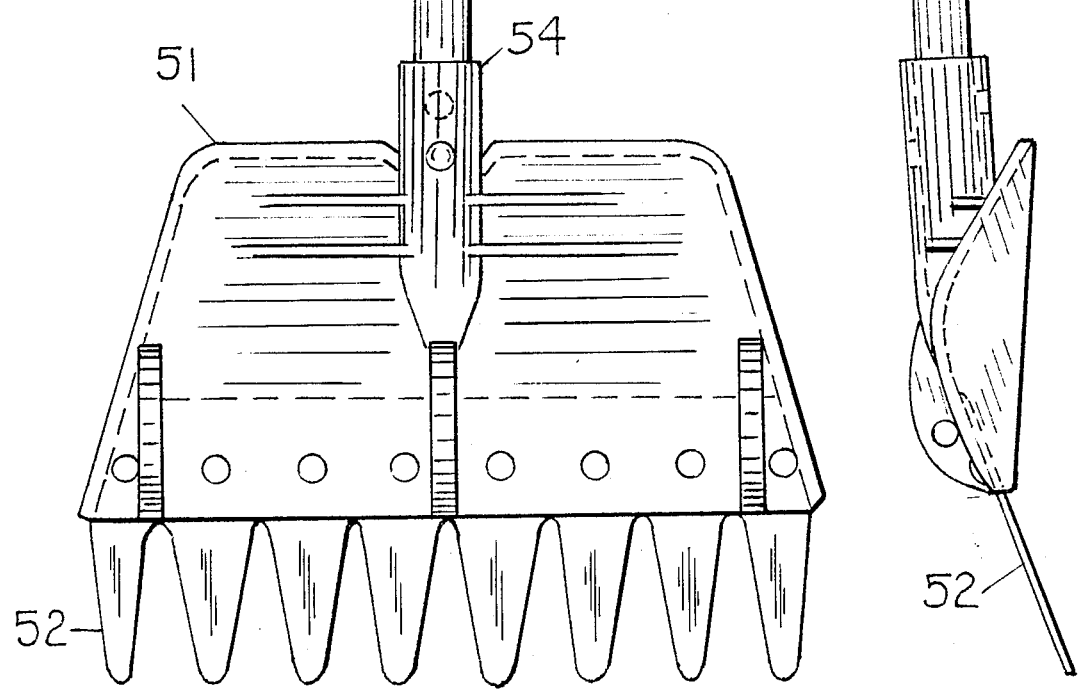
FIG. 49 shows a rear view of an assembly of shovel-head in FIG. 33, tubular rod in FIG. 3, and knob in FIG. 32.
FIG. 50 shows a side view thereof.

FIGS. 33 to 36 show other shapes of teeth, such as strips 59 and 60, than the small teeth 21, shown in FIG. 9. For shoveling leaves, the longer teeth 59 may be preferred. For getting underneath large gravel stones, slender triangular teeth 60, FIG. 35, may be prefered. Other shapes of teeth, such as those of a fork, may be preferred for some tasks, such as for pitching hay or removing manure from a barn. If required, using gloves, one could remove the hay or manure from the fork by hand. In the above figures, toothed strips 52 and 60 are screwed to shovel-head 51 with eight screws 57. Toothed strips 52 and 60 are metal, while shovel-head 51 may be fiber reenforced high impact plastic. Thus, shovel-head 51 has plain holes, while strips 52 and 60 have threaded holes. Hence, heads of screws 57 are shown underneath shovel portion. In FIG. 33, outer edges 58 and 58' of teeth 59 are dull and rounded to avoid harming someone accidentally. Similarly, in FIG. 35, outer edges 61 and 61' are dull and rounded for the same reason, while the remaining teeth may have sharp edges for easier digging, when required. Shovel-head 51 is shown slightly shorter than shovel-head 1, FIG. 9, because of longer teeth 52 and 60. In other ways the shovel-heads are essentially the same. The number of machine screws 57 may be reduced to six from eight in order to reduce the amount of time required to unscrew the machine screws, to remove a strip and replace it with another. FIG. 49 shows a back view assembly of the apparatus with knob 47 replacing bicycle-like handle-bars 9 at one end of tubular rod 7, FIG. 3, and shovel-head 51 with pronged strip 52 at the other end of rod 7. FIG. 50 is a side view thereof. This combination of parts enables this apparatus to be used for raking and gathering manure, as well as transporting the manure to a desired site. If head 51 were replaced by head 22, FIG. 13, then the apparatus could be used for scooping up fish from streams.

Figures 35, 36:
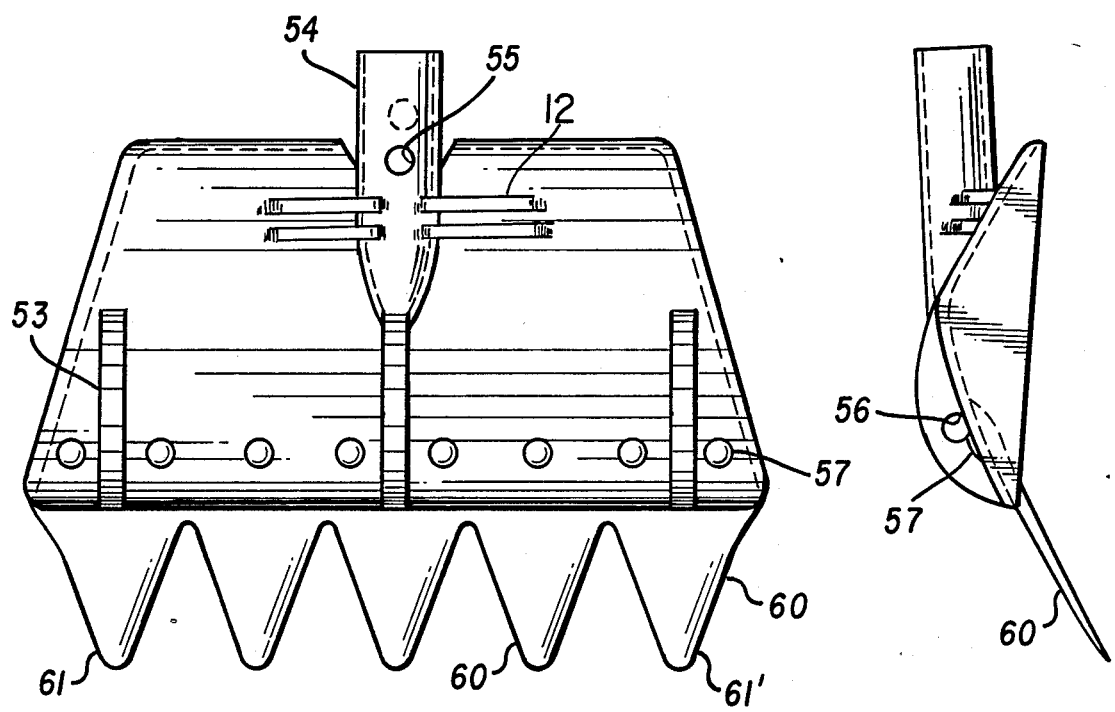
FIG. 35 is a rear view of a shovel-head with wider, fewer teeth.
FIG. 36 is a side view thereof.

FIG. 34 is a side view of FIG. 33, while FIG. 36 is a side view of FIG. 35. Numeral 53, FIGS. 33 and 35, points to the runners, for transportation. As in FIGS. 26 and 27, an axle may be inserted through holes 56 of runners 53. Wheels are mounted at the axle's ends for easier transportation of materials shoveled.

A strip to replace toothed strip 52, FIG. 34, need not have teeth. It may have a straight front edge 24, as an example, FIG. 15.

ANOTHER PREFERRED EMBODIMENT WITH EASILY REPLACEABLE TOOTHED STRIPS

A technique for easier removal of metal toothed strip 59, FIG. 33 or strip 60, FIG. 35, is illustrated in FIGS. 37 to 40.

Figure 37A:
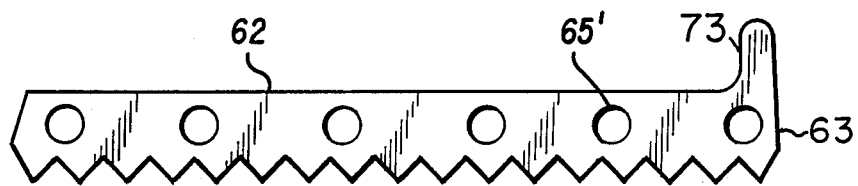
FIG. 37A is a front view of the strip by itself.
Figure 37:
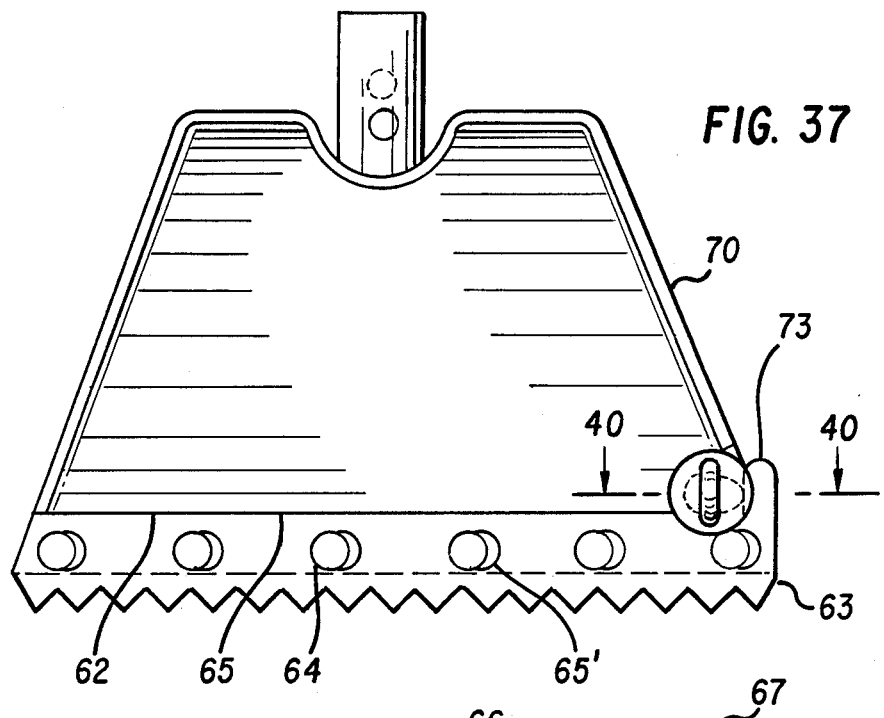
FIG. 37 shows the front partial, assembly view of an easily replaceable toothed strip, including a cam assembly.
Figure 39:
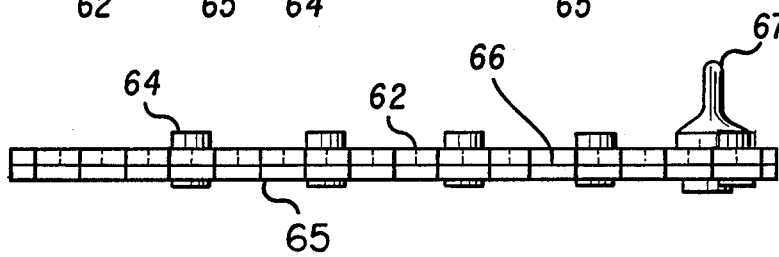
FIG. 39 is a bottom view thereof.

In FIG. 37, a partial assembly of a toothed strip 62, in place on shovel-head 70, is illustrated. The strip 62 is clamped in place by cam 68 of cam assembly 72, as holes of strip 62 are positioned under indentations of studs 66, as shown in FIG. 39. In order for strip 62 to be removed, winged knob 67 of cam assembly 72 must be rotated 180° to the left to enable strip 62 to be slid to the left. Cam 68 would push on projection 73 of strip 62, so that holes 65 will align with cylindrical upper portion of indented studs 64. When thus aligned, strip 62 may be pryed up with a screw driver. Cam 68 is sufficiently off center to cause strip 62 to slide back enough to be removed, or for strip 62 to be clamped in place with holes 65 under indentations 66 of studs 64. Cam assembly 72 has winged knob 67, cam 68, lock washer 69, and threaded portion 71 is fastened to the underside of shovel-head 70. The cam's narrowest portion faces the inside of projection 73, strip 62, as indicated by the dashed line, FIG. 37. Now strip 62 may be push-to the left and pryed up with a screw driver for its removal. Another strip having the same hole sizes and spacing may now replace strip 62. After the new strip has been pushed down into place, winged knob 67 would be rotated 180° to the right to clamp the new strip in position. It should be added that when knob 67 is thus rotated, assembly 72, including cam 68, is tightened, by the assembly screwing into nut 71, FIG. 40; also knob rim 74 closes down on projection 73, to keep it in contact with the upper surface of portion 70, FIG. 40.

Figure 38:
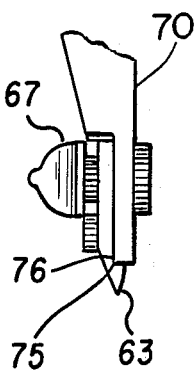
FIG. 38 is a side view thereof.
Figure 40:
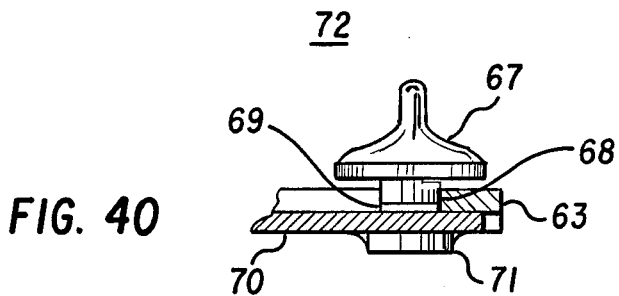
FIG. 40 is a sectional view of the cam assembly taken along line 40—40, except that the winged screw is rotated 90° in a ccw direction, of FIG. 37. This is an enlarged view.

To help align strip 62 with edge 75 of shovel-head, toothed strip 62 has an indentation 75, as shown in FIG. 38, which also helps relieve stresses in studs 64, when attempting to dig with the apparatus. Stress relief would occur since the two edges, shovel-head edge 76 and indentation edge 75, would come in contact with each other. Metal nut 71, FIG. 40, is welded or otherwise fastened to the underside of shovel-head 70, should the shovel portion be made of some other material than metal.

There may be six or eight holes 65 in strip 62, and six or eight studs 64 in shovel-head 70, depending on the portion's width and the necessity to keep the entire strip 62 in contact with the upper surface of head 70. Then, when replacing strip 62 with another strip, it would be desirable to remove any residue from studs 64 and from both the upper surface and edge 76 of shovel-head 70. Cam assembly 72 also should be cleaned. Edges of studs 64 and holes 65 of strip 62 ae rounded for easier removal and replacement of the strip. Also holes 65 of strip 62 may need to be washed thoroughly to remove all sediment. An alternate approach would be to fill in hole crevices with removable rubbery material to prevent dirt from entering therein. Studs 64 may be riveted to holes in head 70 or they may be screwed into threaded holes in head 70, then have the stud' bottom ends pinged over to avoid loosening. It is assumed that head 70 is metal, such as aluminum alloy 6061-T6 for lightness in weight.

In addition to solid materials, such as soil, substantial amounts of liquids may need to be carried short distances in the bowl-like lower portion. If the apparatus is pushed over uneven ground without a lid, the liquid carried could splash over the sides of the lower portion. To better handle this type of situation, a larger bowl-shaped shovel-head 78 with a cover 80 is shown in FIGS. 41 to 43. Two hinges 79 attach cover 80 to portion 78. When wanting to dump out liquids from head 78, cover 80 may be held up vertically, as shown in FIGS. 41 and 42. A catch or latch 81 is provided; two spring steel circular leaves 81 are fastened to rod 7 by means of a single bolt 82, as shown. Projection 83, FIG. 43, is centrally located on cover 80 to engage leaves 81, as shown. By pushing central portion of lid 80 into rod 7's direction.

When cover 80 is swung into shovel-head 78's direction to enclose it, its end or outer edge 86 makes contact with metal strip 87 snugly so that it does not readily lift up when the apparatus is jostled. If cover 80 has a tendency to lift up when apparatus vibrates appreciably, then another catch can be devised at position 87 to prevent cover 80 from lifting up when apparatus is pushed. Note that more material can be carried in head 78 than in the previous lower portions. In addition, the same toothed or plain metal strips may be fastened to the outer edge of head 78 as in the previous shovel-heads, if so desired.

For ploughing applications, it would be preferable for the shovel portion 1, FIG. 1, to tilt or rotate slightly horizontally, so that the soil ploughed could be pushed to the sideas one walks forward with the apparatus. This additional feature can be introduced quite simply by providing additional holes 89 and 90, 92 and 93 in the upper tubular part 3' of shovel portion 88, FIGS. 44 and 45, for hemispherical buttons 13 of spring strip 14, FIGS. 5 and 6, to protrude through. For example, holes 90 and 91, FIG. 46, are diametrically opposing holes, relatively to each other, even as holes 8 and 92 are. Hence, one could hold rod 7, FIG. 44, stationary, and insert lower portion 88 at the desired angle $\beta$, allowing buttons 13 to snap into the holes provided on part 3' of portion 88, FIG. 44. In all other respects portion 88 could be the same as either FIG. 1, 17 or 24.

Dashed lines in FIG. 46 show the shovel portion rotated with respect to rod 7 and angle $\beta$. FIG. 45 shows a side view of portion 88, with holes indicated on tubular part 3'.

Figure 31:
FIG. 31 is a side view thereof.
Figure 31A:
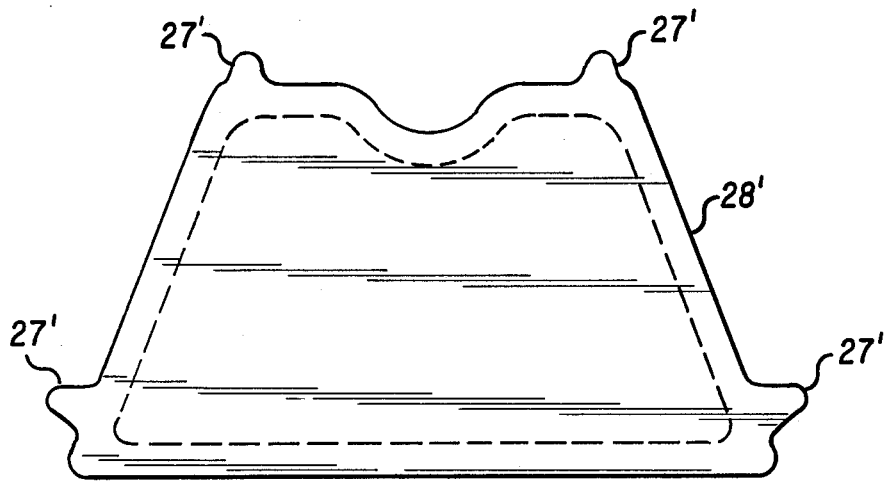
FIG. 31A is a plan view of a shorter overlay without holes.

This bowl-shaped, shovel-like apparatus also may have a perforated shovel portion and plastic overlays, with and without holes. When using the plastic overlay without holes, the apparatus may be transported with water in its bucket to a site where the water is to be dispensed; then the overlay may be lifted so the water can be filtered through the holes in the perforated shovel portion. In this case, overlay 28', FIG. 31A, would have no holes, as shown, and would adhere to the top surface of the shovel-like portion by virtue of press-on adhesive along its borders, as shown in FIG. 31A. To enable lifting the overlay, projections 27' are provided. The overlay could be 1 mm thick pliable vinyl plastic, as a suggestion. As another suggestion, in FIG. 44, tubular part 3' may be reenforced with a metal sleeve having holes to match those existing in tubular part. An alternate approach would be to make tubular part of metal.

What is claimed is:

1. A shovel-like apparatus for digging, scooping and transporting a shovel of loose or wet materials to a desired site, comprising:

(a) a shovel-head formed to provide a semi-enclosure open to the top and providing a support surface portion for the transporting of said shovelful of materials, said head having means for removable attachment of a rod-like member;

(b) a substantially rigid rod-like member with an upper and a lower end, said lower end mountable in the removable attaching means on the shovel-head;

(c) a handle removably attached at its intermediate portion to the upper end of the rod-like member, said handle having a stem portion sized and adapted for removable attachment to the upper end of the rod-like member, said handle having bicycle-like grips on each end of the handle;

(d) a multiplicity of perforations in said shovel-head, these perforations providing means for drainage of unwanted fluid from snow and the like, these perforations also providing means for spreading seed, fertilizer and the like when carried on the upper surface of the shovel-head;

(e) a front-edge strip adapted for removable mounting to a front edge of the support surface portion of said shovel-head, and (f) said head provided with a shaped pliable sheet, perforated with holes, said sheet sized to be removably seated on the support surface portion of the shovel-head, its holes aligning with the holes of said perforations of the shovel-head; but its holes being sized smaller than the holes of said shovel-head;

(g) said head being provided with runners on the underside of said head for ease in transporting of said materials.

2. A shovel-like apparatus as in claim 1, and wherein said bicycle-like grips are replaceable by a stemmed knob, and said strip replaceable by one having several fork-like prongs for scooping up manure, spreading and raking manure or for scooping up fish from streams.

3. A shovel-like apparatus for digging, scooping and transporting a shovelful of loose or wet materials to a desired site, comprising:
(a) a shovel-head formed to provide a semi-enclosure open to the top and providing a support surface portion for the transporting of said shovelful of materials, said head having means for removable attachment of a rod-like member;
(b) a substantially rigid rod-like member with an upper and a lower end, said lower end mountable in the removable attachment means on the shovel-head,
(c) a front-edge strip adapted for removable mounting to a front edge of the support surface portion of said shovel-head;
(d) said support portion formed with a number of studs with indentations which are fastened along said front of said shovel-head support portion member, said studs adapted for protruding through holes formed in said strip, a cam assembly having a winged knob, said cam assembly rotatably fastened to said shovel-head, said knob manually rotated for translational sliding said strip for placement of said strip on said shovel-head support portion, said winged knob when rotated 180° causing said strip to move translationally sufficiently for said strip to engage said indentations of said studs and be clamped in place; the removal of said strip being accomplished by reversing rotation of said knob and causing said strip to move in the opposite direction to enable its removal by prying up said strip with a sharp-edged tool, for the purpose of replacing said strip.

4. A shovel-like apparatus for digging, scooping, plowing and transporting a shovelful of loose or wet materials to a desired site, comprising:
(a) a shovel-head with an upper tubular part and with a support surface for transporting said shovelful of materials, said head having means for removable attachment of a rod-like member;
(b) a substantially rigid rod-like member with an upper and lower end, said lower end mountable in the removable attachment means on the shovel-head;
(c) a handle attached at its intermediate portion to the upper end of the rod-like member, said handle having a removable stem portion, sized and adapted for attachment to the upper end of the rod-like member, said handle having bicycle-like grips on each end of the handle;
(d) the lower end of said rod-like member including two diametrically opposing and staggered button-like hemispheres integrally attached to the ends of leaf springs; said tubular part of said shovel-head including diametrically opposing pair of holes for said button-like hemispheres; said hemispheres protruding through holes in said rod-like member and protruding also through the holes in said tubular part when said end is connected to said tubular part; whereby said rod-like member may be removed easily from said tubular part by manually depressing said hemispheres with one's fingers and simultaneously pulling up on said rod-like member;
(e) said tubular part having a second pair of diametrically opposing holes for said hemispheres, enabling said rod-like member to be slightly rotated in relation to said shovel-head and to the original pair of holes, when assembling said lower end of the rod-like member to said tubular part, so said apparatus can perform a plowing function.

5. A shovel-like apparatus for performing a multitude of farming tasks, including catching fish, by virtue of replaceable attachments to its lower end, including digging, scooping and transporting a shovelful of loose, dry or wet materials to a desired site, comprising a semi-enclosed shovel-head, a lightweight tubular rod having a top and a bottom end, removably attached to said shovel-head; and handles removably attached to said top end of said rod; said head having a top and an underside surface with its front edge having means for attaching various-shaped metal strips; said handles comprising a round tubular stem with bicycle-like handles attached thereto; said shovel-head having perforations for draining off unwanted liquids and for spreading fertilizer and plant seed; wherein said means for attaching said metal strips to said front edge being screws or bolts, one of said strips having prongs like a pitch fork for shoveling said materials, said materials being essentially hay, fodder and manure, and wherein said shovel-head having at least two wheels attached to said underside surface for transporting said materials to a desired site, in order for said apparatus to perform the combined functions of a pitch fork and a wheelbarrow, thus eliminating the lifting operation to transfer said materials to said wheelbarrow; such an apparatus also being helpful for some physically handicapped individuals, enabling them to perform pitch-like operations to remove materials from one location and place them in another location.

6. A shovel-like apparatus for digging, scooping and transporting shovelful of loose or wet materials to a desired site, comprising:
(a) a shovel-head formed to provide a semi-enclosure open to the top and providing a support surface portion for the transporting of said shovelfuls of materials, with said portion, in addition to the support surface portion, configured so as to have upwardly-extending back and end portions providing a defined engageable top surface;
(b) a substantially rigid rod-like member with an upper and a lower end, said lower end mountable in the removable attaching means on the shovel head;
(c) a handle removably attached at its intermediate portion to the upper end of the rod-like member, said handle having a stem portion sized and adapted for removable attachment to the upper end of the rod-like member, said handle having bicycle-like grips on each end of the handle;
(d) a cover hingedly attached to the back portion of the shovel head and in closed condition providing means for securing the contents of and on the support surface portion so as to prevent splashing over the back and ends when and while maneuvering said shovel-like apparatus;

(e) a front-edge strip adapted for removable mounting to a front edge of the support surface portion of said shovel head, and
(f) latch means on said rod-like member and adapted to selectively engage and retain said cover in a "shovel open" condition as and when desired, and by manipulation to release said cover to a closed condition when desired.

7. A shovel-like apparatus as in claim 6 in which the latch means is a U-shaped spring secured to said rod-like member.

8. A shovel-like apparatus as in claim 7 in which the latch means includes an elongated narrow protrusion on said cover adapted to engage said leaf spring to engage and retain said cover in the open condition.

* * * * *